UNITED STATES PATENT OFFICE.

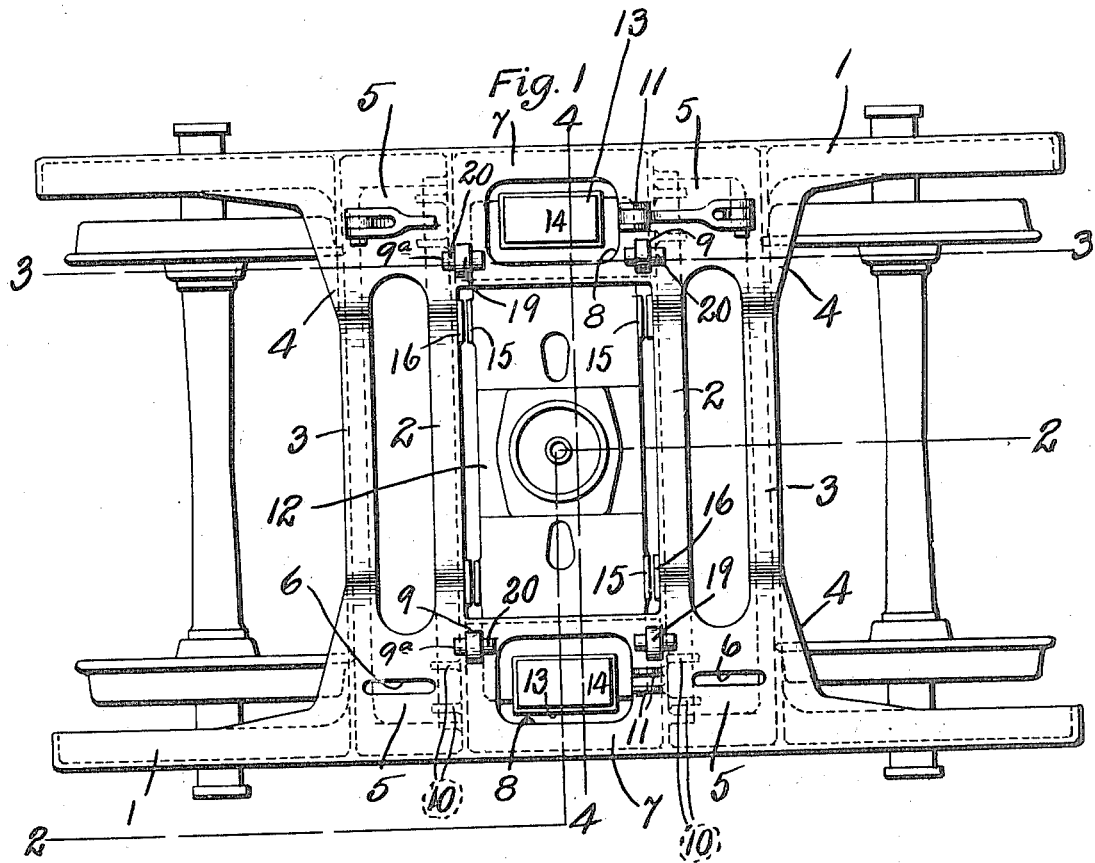
C. H. HOWARD & H. M. PFLAGER.
CAR TRUCK.
APPLICATION FILED SEPT. 17, 1912.
1,060,091.
Patented Apr. 29, 1913.
2 SHEETS—SHEET 1.
Inventors
Clarence H. Howard
Harry M. Pflager C. H. HOWARD & H. M. PFLAGER.
CAR TRUCK.
APPLICATION FILED SEPT. 17, 1912.
1,060,091.
Patented Apr. 29, 1913.
2 SHEETS—SHEET 2.
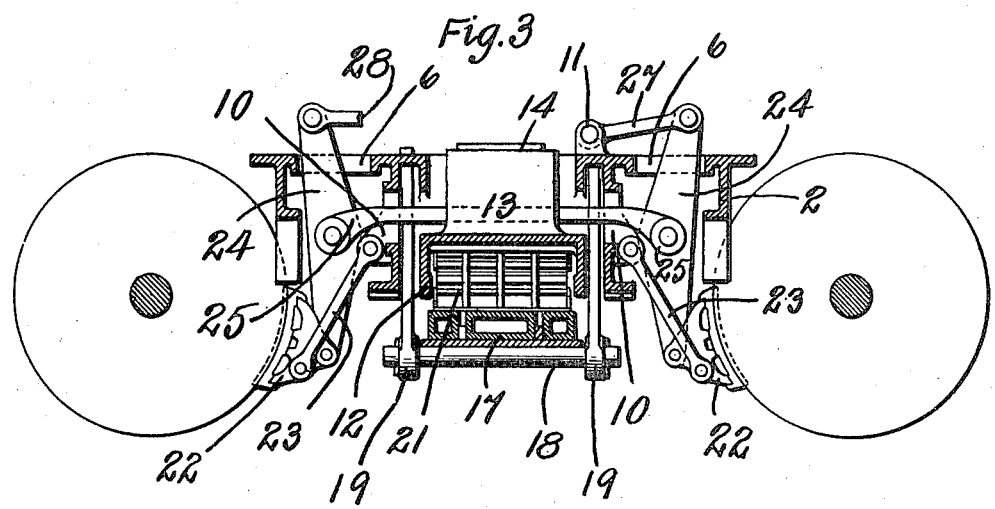
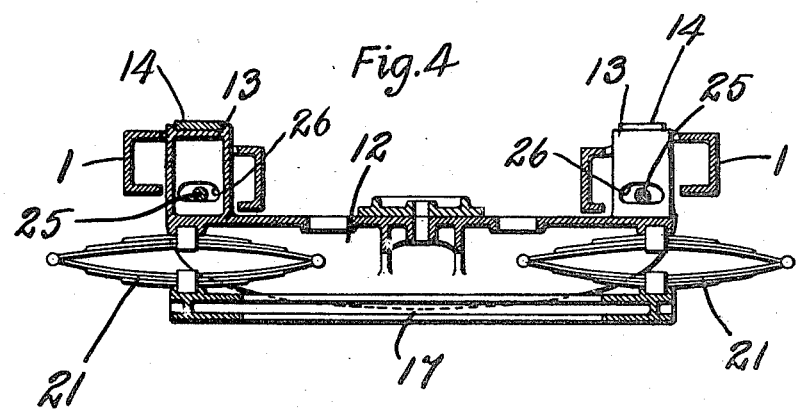
Witnesses
Inventors
Clarence H. Howard
Harry M. Pflager
By F. R. Cornwall, Atty

CLARENCE H. HOWARD AND HARRY M. PFLAGER, OF ST. LOUIS, MISSOURI, ASSIGNORS TO COMMONWEALTH STEEL COMPANY, OF ST. LOUIS, MISSOURI, A CORPORATION OF NEW JERSEY.

CAR-TRUCK.

1,060,091.  Specification of Letters Patent.  Patented Apr. 29, 1913.

Application filed September 17, 1912. Serial No. 720,808.

*To all whom it may concern:*

Be it known that we, CLARENCE H. HOWARD and HARRY M. PFLAGER, citizens of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a plan view of a four-wheel truck constructed in accordance with our invention. Fig. 2 is a side elevational view and a vertical, longitudinal sectional view taken approximately on the line 2—2 of Fig. 1. Fig. 3 is a vertical, longitudinal section taken approximately on the line 3—3 of Fig. 1. Fig. 4 is a cross-sectional view taken approximately on the line 4—4 of Fig. 1.

Our invention relates to new and useful improvements in railway car trucks, particularly of the four-wheel variety, the principal object of our invention being to provide a car truck wherein the truck frame comprising the wheel pieces and transoms is formed in a single piece, preferably by casting, in order to form a strong, rigid and comparatively light-weight structure.

A further object of our invention is to construct a one-piece truck frame having comparatively wide gusset plates between the ends of the transoms and wheel pieces, which gusset plates are provided with openings for the accommodation of upright parts of the brake rigging and the upwardly extended ends of the truck bolster.

A further object of our invention is to combine a one-piece truck frame and a comparatively short bolster, the end portions of which extend upwardly inside the wheel pieces through openings formed in certain of the gusset plates, and which upwardly extended ends carry side bearing members.

With the above and other objects in view our invention consists in certain novel features of construction and arrangement of parts, hereinafter more fully described and claimed.

As shown in the accompanying drawings which illustrate the preferred form of our invention, the wheel pieces 1 and transoms 2 and 3 are formed integral, preferably by casting, with the transoms arranged in pairs on opposite sides of the transverse center of the frame, and the space between the transoms 2 is occupied by the truck bolster. The wheel pieces 1 and transoms 2 and 3 are suitably flanged in order to give the necessary strength and rigidity, and these parts are preferably channel-shape in cross section. The central portions of the transoms are depressed, as shown in Fig. 2, in order to accommodate a center sill member or girder of extra depth.

Formed integral with the end portions of the transoms 3 and the adjacent portions of the wheel pieces 1 are gusset plates 4, and formed integral with the end portions of the transoms 2 and 3 and corresponding portions of the wheel pieces 1 are gusset plates 5 in which are formed longitudinally disposed slots 6 which accommodate the upwardly projecting portions of the main brake levers, hereinafter described. Formed integral with the end portions of the transoms 2 and the central portions of the wheel pieces 1 are gusset plates 7 in which are formed openings 8. Formed through the plates 7 adjacent to the vertically disposed webs of the transoms 2 are openings 9 which receive the upper ends of spring plank hangers, and formed in the tops of the transoms 2 and plates 7 to the sides of these openings are bearings 9ª which receive the pivot pins carried by the upper ends of the spring plank hangers. Formed integral with the outer faces of the transoms 2 and near the ends thereof are lugs 10, the same being arranged in pairs and which serve as points of attachment for the brake head hangers. Formed in the tops of the gusset plates 7 to one side of the openings therein are pairs of lugs 11 to which the dead levers of the brake rigging are connected.

The bolster 12, utilized in connection with our improved truck frame, is preferably cast in a single piece and comprises a top plate and side walls, and therefore said bolster is substantially of inverted trough shape in cross section. This bolster is positioned between the transoms 2 with its ends positioned beneath the gusset plates 7, and formed integral with or fixed to the ends of this bolster are upward extensions 13 which project through the openings 8 in said gusset plates 7. Fixed on top of these upward extensions 13 are suitable side bearing members 14. The openings 8 in the gusset plates 7 are substantially larger than the upward extensions 13, and thus said bolster has a certain range of movement transversely with respect to the truck frame. Formed on the outer faces of the side plates or walls of the bolster 12 are chafing plates 15, and formed on the inner faces of the transoms 2 are corresponding chafing plates 16.

17 designates a spring plank of ordinary form, the ends of which are suitably mounted on supporting rods 18 carried by the lower ends of spring plank hangers 19, and the upper ends of these hangers project through the openings 11 in the gusset plates 7 and are provided with short pins or trunnions 20 that engage in the bearings 9a. Interposed between the end portions of the spring plank 17 and the end portions of the bolster 12 are ordinary elliptic springs 21.

The brake rigging utilized in connection with our improved truck is of the beamless type, and comprises brake heads 22, each of which is supported by a pair of swing hangers or links 23, the upper ends of which are pivotally connected to the lugs 10. Pivotally connected to each brake head is the lower end of a vertically disposed brake lever 24, and the corresponding pairs of these levers on the sides of the truck frame are connected by horizontally disposed links or members 25 which pass through horizontally disposed openings 26 in the upward extensions 13 on the ends of the bolster 12. These openings 26 are of sufficient size to permit the bolster to move transversely of the truck frame without bearing against the brake lever connecting rods.

The upper portions of the brake levers 24 extend through the slots 6 in the gusset plates 5, and the upper ends of said levers on one side of the truck frame are pivotally connected to links or dead levers 27, the opposite ends of which latter are pivotally connected to the lugs 11. The upper ends of the brake levers 24 on the opposite side of the truck are connected by means of links 28 to one of the floating levers of the brake rigging.

Our improved truck frame is equipped with the usual detachable pedestals, (not shown) and bearing on the journal boxes between said pedestals are the ends of the usual equalizer bars 29. Interposed between the wheel pieces 1 and the equalizer bars are the usual heavy coil springs 30.

A car truck of our improved construction is comparatively simple, can be easily and cheaply manufactured for the reason that the main parts of the truck frame, namely the wheel pieces and transoms, are formed in a single piece, thereby effecting a material saving of the time, labor and consequent expense usually involved in assembling the essential parts of a built-up truck frame, and by our improved construction a very strong and rigid truck frame is produced and the various brake rigging attaching lugs are formed integral with the parts of the truck frame.

It will be readily understood that minor changes in the size, form and construction of the various parts of our improved truck can be made and substituted for those herein shown and described without departing from the spirit of our invention, the scope of which is set forth in the appended claims.

We claim:

1. In a car truck, a truck frame having wheel pieces and transoms, gusset plates between the end portions of said transoms and the wheel pieces, which gusset plates are provided with openings, and a bolster supported between the transoms, the end portions of which bolster project upwardly through the openings in the gusset plates.

2. In a car truck, a truck frame having wheel pieces and transoms, gusset plates between the end portions of said transoms and the wheel pieces, which gusset plates are provided with openings, a bolster supported between the transoms, the end portions of which bolster project upwardly through the openings in the gusset plates, and side bearings carried by the upwardly projecting ends of the bolster.

3. In a car truck, a truck frame cast in a single piece and comprising wheel pieces, transoms and gusset plates between the end portions of said transoms and the wheel pieces, which gusset plates are provided with openings for the accommodation of upwardly projecting parts of the truck bolster.

4. In a car truck, the combination with a truck frame comprising wheel pieces and transoms, of a truck bolster supported from the frame, the end portions of which bolster are provided with openings for the accommodation of parts of the brake rigging of the truck.

5. In a car truck, the combination with a truck frame comprising wheel pieces and transoms, of a truck bolster supported from the frame, and the end portions of which bolster extend upward inside the wheel pieces, and are provided with openings for the accommodation of parts of the brake rigging of the truck.

6. In a car truck, the combination with a truck frame having wheel pieces, transoms, and gusset plates between the end portions of said transoms and wheel pieces, which gusset plates are provided with openings, of a truck bolster supported between the transoms, the ends of which bolster project beneath the gusset plates and terminate inside the wheel pieces, and side bearing members mounted on the ends of said bolster and projecting upwardly through the openings in the gusset plates.

7. In a car truck, the combination with a truck frame, of a bolster supported within said frame, the main body portion of which bolster occupies a plane below the wheel pieces of the truck frame, and the ends of which bolster are provided with openings for the accommodation of parts of the brake rigging of the truck.

8. In a car truck, the combination with a truck frame, of a bolster supported within said frame, the main body portion of which bolster occupies a plane below the wheel pieces of the truck frame, the end portions of which bolster extend upwardly inside the wheel pieces, side bearing members carried by said upwardly extended ends and the end portions of which bolster are provided with openings adapted to receive parts of the brake rigging of the truck.

9. In a car truck, a bolster having its end portions extended upward for supporting side bearing members in a horizontal plane substantially above the plane occupied by the main body portion of said bolster and said upwardly extended end portions having openings for the accommodation of parts of the brake rigging.

10. In a car truck of the class described, a truck bolster provided with openings in its ends for the accommodation of parts of the brake rigging of the truck.

11. In a car truck, a bolster, side bearing carrying members on the ends thereof, and which side bearing carrying members are provided with openings for the accommodation of parts of the brake rigging of the truck.

12. In a car truck, a truck frame having integrally formed wheel pieces and transoms, gusset plates between the end portions of said transoms and wheel pieces, which gusset plates are provided with openings for the accommodation of parts carried by the bolster and for upright parts of the brake rigging of the truck and certain of the transoms being provided with horizontally alined openings for horizontally disposed parts of the brake rigging.

13. In a car truck, a truck frame comprising wheel pieces, transoms and gusset plates between the ends of the transoms and wheel pieces, which gusset plates are provided with openings, and the central portions of which transoms are depressed relative to the wheel pieces, of a truck bolster supported between the transoms, the main body portion of which bolster occupies substantially the same plane with the depressed portions of the transoms, and the ends of which bolster extend upwardly inside the wheel pieces through the openings in the gusset plates.

14. In a car truck, a truck frame comprising wheel pieces, transoms and gusset plates between the ends of the transoms and wheel pieces, which gusset plates are provided with openings, and the central portions of which transoms are depressed relative to the wheel pieces, of a truck bolster supported between the transoms, the main body portion of which bolster occupies substantially the same plane with the depressed portions of the transoms, the ends of which bolster extend upwardly inside the wheel pieces through the openings in the gusset plates, and side bearings on the upwardly extended ends of the bolster.

15. In a car truck, a truck frame having integrally formed wheel pieces and transoms, gusset plates between the end portions of said transoms and the wheel pieces, said gusset plates being provided with openings for the accommodation of parts carried by the truck bolster, and with slots for the accommodation of upright portions of the brake rigging of the truck and certain of which transoms are provided with horizontally alined openings for the accommodation of horizontally disposed parts of the brake rigging.

In testimony whereof we hereunto affix our signatures in the presence of two witnesses, this 30th day of August, 1912.

CLARENCE H. HOWARD.
HARRY M. PFLAGER.

Witnesses:
HAL C. BELLVILLE,
FRED H. BLANKENHORN.